US011468420B2

(12) United States Patent
Ahn et al.

(10) Patent No.: US 11,468,420 B2
(45) Date of Patent: Oct. 11, 2022

(54) DIGITAL MODULE BUILT-IN DESK

(71) Applicant: Hyosung TNS Inc., Seoul (KR)

(72) Inventors: Young Ho Ahn, Hwaseong-si (KR); Yoo Mee Min, Seongnam-si (KR); Young Jin Yoon, Seoul (KR); Hyeokjun Yun, Seoul (KR); Won Seok Lee, Wonju-si (KR); Hee-youn Lee, Gwangju-si (KR); Byung Seok Han, Seongnam-si (KR)

(73) Assignee: Hyosung TNS Inc., Seoul (KR)

( * ) Notice: Subject to any disclaimer, the term of this patent is extended or adjusted under 35 U.S.C. 154(b) by 0 days.

(21) Appl. No.: 17/115,300

(22) Filed: Dec. 8, 2020

(65) Prior Publication Data

US 2022/0092571 A1 Mar. 24, 2022

(30) Foreign Application Priority Data

Sep. 23, 2020 (KR) .......................... 10-2020-0122821

(51) Int. Cl.
*A47B 21/04* (2006.01)
*G06Q 20/20* (2012.01)
(Continued)

(52) U.S. Cl.
CPC .......... *G06Q 20/206* (2013.01); *A47B 21/04* (2013.01); *A47F 9/046* (2013.01); *G06Q 20/204* (2013.01);
(Continued)

(58) Field of Classification Search
CPC .. G06Q 20/206; G06Q 20/204; G06Q 20/209; G06Q 30/0268; A47B 21/04;
(Continued)

(56) References Cited

U.S. PATENT DOCUMENTS 4,617,457 A * 10/1986 Granzow ............. G06Q 20/042
  902/20
5,267,149 A * 11/1993 Anada ...................... G07F 7/10
  235/379
(Continued)

FOREIGN PATENT DOCUMENTS

CA     2693322 A1 *  3/2009 ........... G06F 1/1616
CN  202615515 U  * 12/2012
(Continued)

OTHER PUBLICATIONS

Runji, Joel Murithi, and Chyi-Yeu Lin. "Switchable Glass Enabled Contextualization fora Cyber-Physical Safe and Interactive Spatial Augmented Reality PCBA Manufacturing Inspection System." Sensors (Basel, Switzerland) 20.15 (2020): 4286-. Web. (Year: 2020).*
(Continued)

*Primary Examiner* — Ashford S Hayles
(74) *Attorney, Agent, or Firm* — Fish & Richardson P.C.

(57) ABSTRACT

A digital module built-in desk to be placed at a location where business transactions between a clerk and a customer are performed is provided. The desk includes a desk body including an upper plate having a customer-side desk portion providing a space for the customer; a customer digital module mounted in the customer-side desk portion, the customer digital module including a tablet through which information necessary for the business transactions is inputted; and a clerk digital module provided in the side of the clerk-side desk portion, the clerk digital module including a monitor for displaying information necessary for the business transactions.

16 Claims, 10 Drawing Sheets

(51) Int. Cl.
*A47F 9/04* (2006.01)
*G06Q 30/02* (2012.01)

(52) U.S. Cl.
CPC ....... *G06Q 20/209* (2013.01); *G06Q 30/0268* (2013.01); *A47B 2200/008* (2013.01); *A47B 2200/12* (2013.01); *A47F 2009/041* (2013.01)

(58) Field of Classification Search
CPC ........... A47B 2200/008; A47B 2200/12; A47F 9/046; A47F 2009/041
See application file for complete search history.

(56) References Cited

U.S. PATENT DOCUMENTS

| | | | | |
|---|---|---|---|---|
| 6,547,132 B1* | 4/2003 | Templeton | ............... | G07G 1/12 235/379 |
| 6,629,636 B1* | 10/2003 | Hayashi | ............... | G09F 7/00 235/383 |
| 6,640,142 B1* | 10/2003 | Wong | ............... | G05B 15/02 700/19 |
| 6,676,016 B1* | 1/2004 | Coskrey, IV | ............... | G06Q 20/206 235/382 |
| 6,681,985 B1* | 1/2004 | Curtin | ............... | E04H 1/06 705/42 |
| 6,695,204 B1* | 2/2004 | Stinson | ............... | G07C 9/253 235/382 |
| D525,282 S * | 7/2006 | Barnes | ............... | D18/4.5 |
| D526,002 S * | 8/2006 | Nakajima | ............... | D18/4.5 |
| 7,349,884 B1* | 3/2008 | Odom | ............... | G07F 7/04 705/40 |
| 7,529,687 B1* | 5/2009 | Phan | ............... | G06Q 30/0271 705/14.67 |
| 7,970,650 B2* | 6/2011 | Tokorotani | ............... | G06Q 20/204 361/4 |
| 9,082,114 B2* | 7/2015 | Colley | ............... | G07F 19/20 |
| 11,119,721 B1* | 9/2021 | Harris | ............... | G07G 1/01 |
| 11,176,532 B2* | 11/2021 | Oda | ............... | G06Q 20/208 |
| 2002/0138431 A1* | 9/2002 | Antonin | ............... | G06Q 20/108 705/42 |
| 2003/0023555 A1* | 1/2003 | Rees | ............... | G07F 19/20 705/44 |
| 2004/0122754 A1* | 6/2004 | Stevens, III | ............... | G06Q 20/042 705/42 |
| 2004/0205023 A1* | 10/2004 | Hafer | ............... | G07F 7/1008 705/43 |
| 2004/0220876 A1* | 11/2004 | Liu | ............... | G06Q 20/40 705/44 |
| 2005/0080697 A1* | 4/2005 | Foss, Jr. | ............... | G06Q 40/00 705/35 |
| 2005/0162405 A1* | 7/2005 | Ono | ............... | G09G 3/20 345/173 |
| 2006/0054685 A1* | 3/2006 | Vergara | ............... | G07F 19/205 235/379 |
| 2006/0096140 A1* | 5/2006 | Waterhouse | ............... | G09F 1/14 40/541 |
| 2006/0108414 A1* | 5/2006 | Sorenson | ............... | G06Q 20/18 235/381 |
| 2006/0129478 A1* | 6/2006 | Rees | ............... | G06Q 40/025 705/38 |
| 2006/0289628 A1* | 12/2006 | Gunst | ............... | G07D 11/14 235/379 |
| 2006/0289629 A1* | 12/2006 | Smith | ............... | G07G 1/01 235/379 |
| 2007/0075129 A1* | 4/2007 | Hanna | ............... | G06Q 20/10 235/379 |
| 2007/0244778 A1* | 10/2007 | Bai | ............... | G06Q 40/02 705/35 |
| 2007/0288370 A1* | 12/2007 | Konja | ............... | G06Q 20/10 705/41 |
| 2008/0083826 A1* | 4/2008 | Henry | ............... | G06Q 20/18 705/17 |
| 2008/0191008 A1* | 8/2008 | Manfredi | ............... | G06Q 30/06 235/379 |
| 2008/0301049 A1* | 12/2008 | Dyson | ............... | G06Q 40/00 705/42 |
| 2009/0063342 A1* | 3/2009 | Beckers | ............... | G06Q 20/105 705/41 |
| 2009/0076934 A1* | 3/2009 | Shahbazi | ............... | G06Q 40/02 705/40 |
| 2009/0177570 A1* | 7/2009 | Mehta | ............... | G06Q 20/108 705/35 |
| 2009/0198582 A1* | 8/2009 | Tokorotani | ............... | G06Q 20/208 705/17 |
| 2009/0259516 A1* | 10/2009 | Zeevi | ............... | G06Q 30/0255 705/14.53 |
| 2009/0296331 A1* | 12/2009 | Choy | ............... | G06F 1/1649 715/761 |
| 2010/0042540 A1* | 2/2010 | Graves | ............... | G06Q 20/347 235/382 |
| 2010/0044430 A1* | 2/2010 | Song | ............... | G06Q 40/00 235/379 |
| 2010/0128047 A1* | 5/2010 | Makino | ............... | G09G 5/363 345/581 |
| 2010/0156756 A1* | 6/2010 | Sitbon | ............... | G06Q 10/00 710/316 |
| 2010/0217697 A1* | 8/2010 | MacGuire | ............... | G06Q 20/10 705/40 |
| 2011/0047020 A1* | 2/2011 | Iwazaki | ............... | G06Q 30/0233 235/375 |
| 2011/0054677 A1* | 3/2011 | Liddell | ............... | G06Q 20/202 709/204 |
| 2011/0058321 A1* | 3/2011 | Yoshizawa | ............... | H05K 5/0204 361/679.01 |
| 2011/0155799 A1* | 6/2011 | Meszaros | ............... | G06Q 20/102 235/379 |
| 2012/0036069 A1* | 2/2012 | Silvestre | ............... | G06Q 20/10 705/42 |
| 2012/0203572 A1* | 8/2012 | Christensen | ............... | G06Q 30/02 705/2 |
| 2012/0284182 A1* | 11/2012 | Beckers | ............... | G06Q 40/02 705/41 |
| 2013/0006785 A1* | 1/2013 | Perkins | ............... | G06Q 20/202 705/18 |
| 2013/0054391 A1* | 2/2013 | Hipolito | ............... | G06Q 20/20 705/17 |
| 2014/0008431 A1* | 1/2014 | Patel | ............... | G07F 19/202 705/45 |
| 2014/0297436 A1* | 10/2014 | Goodwin, III | ............... | G07F 19/20 705/21 |
| 2015/0356660 A1* | 12/2015 | L'Heureux | ............... | G06Q 30/0269 705/26.7 |
| 2016/0070964 A1* | 3/2016 | Conrad | ............... | G07G 1/0018 348/150 |
| 2016/0260019 A1* | 9/2016 | Riquelme Ruiz | ............... | G06N 20/00 |
| 2018/0150818 A1* | 5/2018 | Mocko | ............... | G06Q 20/384 |
| 2019/0303938 A1* | 10/2019 | Sanchez-Llorens | ............... | G06Q 20/405 |
| 2021/0392290 A1* | 12/2021 | McNelley | ............... | H04N 7/144 |

FOREIGN PATENT DOCUMENTS

| | | | |
|---|---|---|---|
| CN | 203969889 U | * | 12/2014 |
| CN | 204838838 | | 12/2015 |
| JP | 11-266933 A | | 10/1999 |
| JP | 2003281623 A | * | 10/2003 |
| JP | 2003281626 A | * | 10/2003 |
| JP | 2004-163837 A | | 6/2004 |
| JP | 2006-158731 A | | 6/2006 |
| JP | 2006158731 A | * | 6/2006 |
| JP | 2011018130 A | * | 1/2011 |
| JP | 2011050728 A | * | 3/2011 |
| JP | 2013182485 A | * | 9/2013 |
| JP | 2020-081017 A | | 6/2020 |
| KR | 20110072707 A | * | 6/2011 |

(56) References Cited

FOREIGN PATENT DOCUMENTS

KR     20-2015-0004034 A     11/2015
KR           101758445 B1 *   7/2017

OTHER PUBLICATIONS

Anquetil-Deck, Candy. "Liquid Crystal Films Confined Between Patterned Substrates." ProQuest Dissertations Publishing, 2008. Print. (Year: 2008).*
Tysiac-Mista, Monika et al. "Air Disinfection Procedures in the Dental Office During the COVID-19 Pandemic." Medycyna pracy 72.1 (2021): 39-48. Web. (Year: 2021).*
Extended European Search Report in European Appln. No. 20210769.4, dated May 11, 2021, 8 pages.
"Apply for 'Corona Loan and Disaster Support Fund' at the bank from tomorrow", May 17, 2020, Maeil Daily News, Seoul, Republic of Korea.

* cited by examiner

DIGITAL MODULE BUILT-IN DESK

CROSS-REFERENCE TO RELATED APPLICATIONS

This application is based on and claims priority from Korean Patent Application No. 10-2020-0122821, filed on Sep. 23, 2020, the disclosures of which are incorporated herein in their entirety by reference for all purposes.

TECHNICAL FIELD

The present disclosure relates to a digital module built-in desk.

BACKGROUND

In general, a clerk in a bank prepares various office equipment and documents in order to consult with a customer and provide necessary information to the customer. By using the office equipment and the documents placed on a desk or in a drawer, the clerk can provide necessary information to the customer while doing his/her work.

However, putting the office equipment and the documents on the desk, the top of the desk can be messy and the space on the desk may be insufficient to provide materials to a customer when consulting with the customer. Meanwhile, when the office equipment, the documents and the like are put in the drawer, it may be inconvenient to use the office equipment and the documents and the like as the clerk needs to take out the office equipment and the documents and the like from the drawer.

In particular, in an epidemic of an infectious disease, when a clerk and a customer make face-to-face consultation with a desk between them, proper consultation between the clerk and the customer may be difficult due to the fear of infection.

SUMMARY

In view of the above, the present disclosure provides a digital module built-in desk which allows a clerk and a customer to efficiently perform business transactions therebetween.

In accordance with an implementation of the present disclosure, there is provided a digital module built-in desk to be placed at a location where business transactions between a clerk and a customer are performed, the desk including: a desk body including an upper plate having a customer-side desk portion providing a space for the customer; and a customer digital module mounted in the customer-side desk portion, the customer digital module including a tablet through which information necessary for the business transactions is inputted.

The desk body may further include a clerk-side desk portion providing a space for the clerk, and wherein the customer-side desk portion and the clerk-side desk portion are disposed opposite to each other with respect to a center line of the upper plate.

The digital module built-in desk may further include: a partition installed along the center line to partition between the clerk-side desk portion and the customer-side desk portion.

The customer digital module may further include: a customer-side board mounted to be embedded in the customer-side desk portion; and at least one of a sign pad, a pin pad, an identification card scanner, a seal scanner, an intestinal vein terminal, an NFC reader, and a fingerprint reader which are provided in the customer-side board.

The digital module built-in desk may further include a clerk digital module provided in the side of the clerk-side desk portion, the clerk digital module including a monitor for displaying information necessary for the business transactions.

The clerk digital module may further include: a clerk-side input device connected to the clerk-side monitor to allow the clerk to input information; a clerk-side output device for outputting data on a business service; and a personal computer for controlling the clerk-side monitor, the clerk-side input device, and the clerk-side output device.

The clerk-side input device may include a scanner, and the clerk-side output device may include at least one of a paper printer, a passbook printer, a card issuing machine and a Teller cash recycler.

The desk body may further include a wiring hole extending through the customer-side desk portion and the clerk-side desk portion to connect between the customer digital module and the personal computer.

The partition may be a transparent display panel or an opaque display panel which includes at least one of a liquid crystal display, a light emitting diode, and a head up display.

The partition may provide a service passage of a predetermined size for business transactions between the clerk and the customer.

The digital module built-in desk may further include: an advertisement module, installed at one end portion of the upper plate, for displaying advertisement for a product.

In accordance with the implementations of the present disclosure, it is possible to accurately distinguish between a device for the customer and a device for the clerk at a bank window, and the customer can use the device for the customer.

In addition, it is possible to implement a self-banking service with face-to-face assist, thereby minimizing business services requested by customers and enhancing work efficiency.

Further, it is possible to minimize materials put on the desk through the digitalized work environment. Moreover, even in the epidemic of an infectious disease, smooth consultation can be performed between the clerk and the customer since the possibility of infection is reduced.

DETAILED DESCRIPTION

Figure 1:
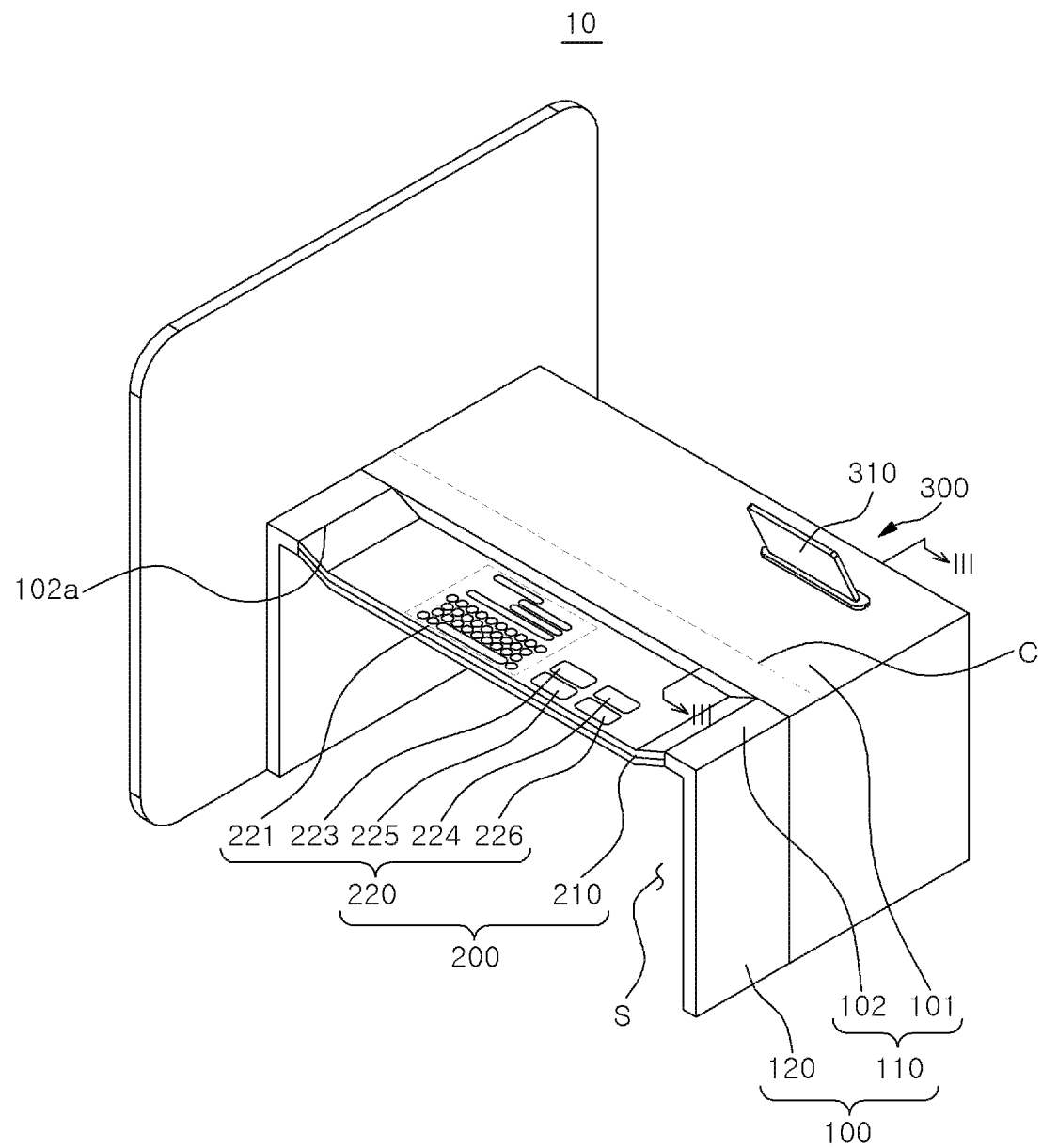
FIG. 1 is a perspective view showing a digital module built-in desk according to a first implementation of the present disclosure.

Hereinafter, configurations and operations of implementations will be described in detail with reference to the accompanying drawings. The following description is one of various patentable aspects of the disclosure and may form a part of the detailed description of the disclosure.

In describing the implementations of the present disclosure, the detailed descriptions of well-known functions or configurations will be omitted if it is determined that the detailed descriptions of well-known functions or configurations may unnecessarily make obscure the spirit of the present disclosure.

The disclosure may be variously modified and may include various implementations. Specific implementations will be exemplarily illustrated in the drawings and described in the detailed description of the implementations. However, it should be understood that they are not intended to limit the disclosure to specific implementations but rather to cover all modifications, similarities, and alternatives which are included in the spirit and scope of the disclosure.

The terms used herein, including ordinal numbers such as "first" and "second" may be used to describe, and not to limit, various components. The terms simply distinguish the components from one another.

When it is said that a component is "connected" or "linked" to another component, it should be understood that the former component may be directly connected or linked to the latter component or a third component may be interposed between the two components.

Specific terms in the present disclosure are used simply to describe specific implementations without limiting the present disclosure. An expression used in the singular encompasses the expression of the plural, unless it has a clearly different meaning in the context.

Hereinafter, an implementation of the present disclosure will be described in detail with reference to the accompanying drawings.

Figure 2:
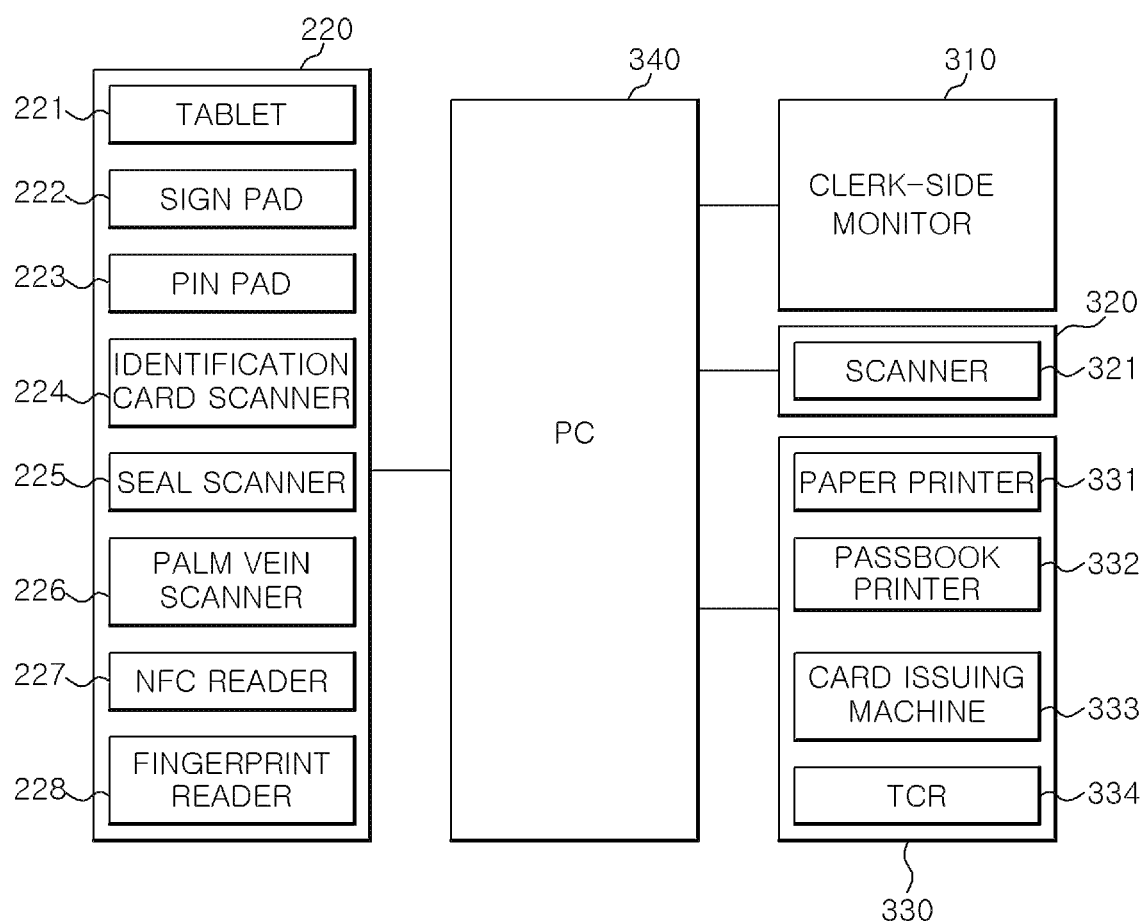
FIG. 2 is a block diagram showing a control flow of the digital module built-in desk according to the first implementation.
Figure 3:
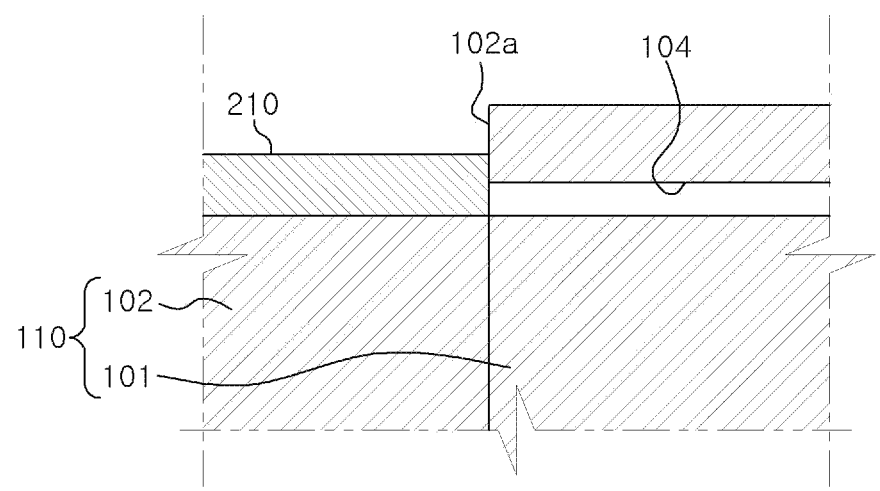
FIG. 3 is a cross-sectional view taken along the line III-III of FIG. 1.

FIG. 1 is a perspective view showing a digital module built-in desk according to a first implementation of the present disclosure, FIG. 2 is a block diagram showing a control flow of the digital module built-in desk according to the first implementation, and FIG. 3 is a cross-sectional view taken along the line III-III of FIG. 1.

Referring FIGS. 1 to 3, a digital module built-in desk 10 according to the first implementation of the present disclosure includes a desk body 100, a customer digital module 200, and a clerk digital module 300.

Specifically, the desk body 100 may be disposed at a window in a bank where a business transaction between a clerk and a customer is performed. The desk body 100 may include an upper plate 110 and a support 120 supporting the upper plate 110.

The upper plate 110 may include a clerk-side desk portion 101 and a customer-side desk portion 102 which are divided by a virtual boundary line. The virtual boundary line may be a virtual center line C positioned in a center of the upper plate 110, and may extend in a left and right direction. Further, the clerk-side desk portion 101 and the customer-side desk portion 102 may be areas separated from each other on the upper plate 110. The clerk-side desk portion 101 and the customer-side desk portion 102 are disposed opposite to each other with respect to the center line C of the upper plate 110. A bank clerk may be positioned on the side of the clerk-side desk portion 101. The clerk-side desk portion 101 may provide a space for a clerk's work on the upper plate 110. A variety of office equipment and documents may be temporarily stored on the clerk-side desk portion 101. In addition, at least one part of the clerk digital module 300 may be mounted on the clerk-side desk portion 101. For example, a clerk-side monitor 310 may be mounted on the clerk-side desk portion 101.

A customer may be located in the side of the customer-side desk portion 102. The customer-side desk portion 102 may provide a space for a customer on the upper plate 110. The customer digital module 200 may be embedded in the customer-side desk portion 102. To this end, a module mounting recess 102a in which the customer digital module 200 is mounted may be formed in the customer-side desk portion 102. The module mounting recess 102a may be provided in a recess shape corresponding to the shape of a lower portion of the customer digital module 200 so that the customer digital module 200 is fitted in the module mounting recess 102a.

In the upper plate 110, a wiring hole portion 104 may be formed to extend through the customer-side desk portion 102 and the clerk-side desk portion 101. The wiring hole portion 104 may be formed to penetrate between the customer desk portion 102 and the clerk desk portion 101, and a space in which a wire is extended may be provided in the wiring hole portion 104.

For example, a communication line or a power line, which connects between the customer digital module 200 mounted in the customer-side desk portion 102 and the clerk digital module 300 or a personal computer (PC) 340 located on the side of the clerk-side desk portion 101, may be located in a wiring hole portion 104.

The support 120 may be provided in the form of a pair of legs supporting both side end portions of the upper plate 110. A space S into which a chair for a customer or a chair for a clerk can be inserted may be provided between the pair of supports 120.

The customer digital module 200 may be mounted in the customer-side desk portion 102. For example, the customer digital module 200 may be seated in the module mounting recess 102a of the customer-side desk portion 102. In this case, since the customer digital module 200 is located at a level below the upper surface of the upper plate 110, the customer can easily input information necessary for business transactions through the customer digital module 200. For example, the customer digital module 200 may be embedded in the customer-side desk portion 102 such that a lower surface of the customer digital module 200 is located below an upper surface of the upper plate 110.

The customer digital module 200 may include a customer-side board 210 and a customer-side input device 220. The customer-side board 210 may be a frame board mounted to be embedded in the customer-side desk portion 102. The customer-side board 210 may be provided with the customer-side input device 220 for inputting information necessary for business transactions.

The customer-side input device 220 may include at least one of a tablet 221, a sign pad 222, a pin pad 223, an identification card scanner 224, a seal scanner 225, a palm vein scanner 226, a near field communication (NFC) reader 227 and a fingerprint reader 228, which are used for information input.

In the present implementation, although the customer-side input device 220 is configured to include at least one of the tablet 221, the sign pad 222, the pin pad 223, the identification card scanner 224, the seal scanner 225, the palm vein scanner 226, the NFC reader 227 and the fingerprint reader 228, the present disclosure is not limited thereto. The customer-side input device 220 may further include an additional device for inputting information.

The clerk digital module 300 may provide a business service requested by a customer on the side of the clerk-side desk portion 101. The clerk digital module 300 may include a clerk-side monitor 310, a clerk-side input device 320, a clerk-side output device 330, and the PC 340.

The clerk-side monitor 310 may be a monitor mountable on the clerk-side desk portion 101. A variety of information for providing a business service requested by a customer may be displayed on the clerk-side monitor 310. The clerk-side input device 320 may be connected to the PC 340 and the clerk-side monitor 310. A clerk may input information through the clerk-side input device 320. The clerk-side input device 320 may include a keyboard and a scanner 321 for inputting information.

The clerk-side output device 330 may output data for business services under the control of the PC 340. The clerk-side output device 330 may include at least one of a paper printer 331, a passbook printer 332, a card issuing machine 333, and a teller cash recycler (TCR) 334.

The paper printer 331, the passbook printer 332, the card issuing machine 333 and the TCR 334 may be located close to the clerk-side desk portion 101 for convenience of access of the clerk. For example, the paper printer 331, the passbook printer 332 and the card issuing machine 333 may be located on one side of the clerk-side desk portion 101, and the TCR 334 may be located on the other side of the clerk-side desk portion 101.

The PC 340 may include a PC device for controlling the clerk-side monitor 310, the clerk-side input device 320, and the clerk-side output device 330. The PC 340 may be located in the space S located on the clerk side. The PC 340 may be implemented by an operation device including a microprocessor, a memory and the like. The implementation method is obvious to those skilled in the art, and thus further detailed description thereof will be omitted.

Figure 4:
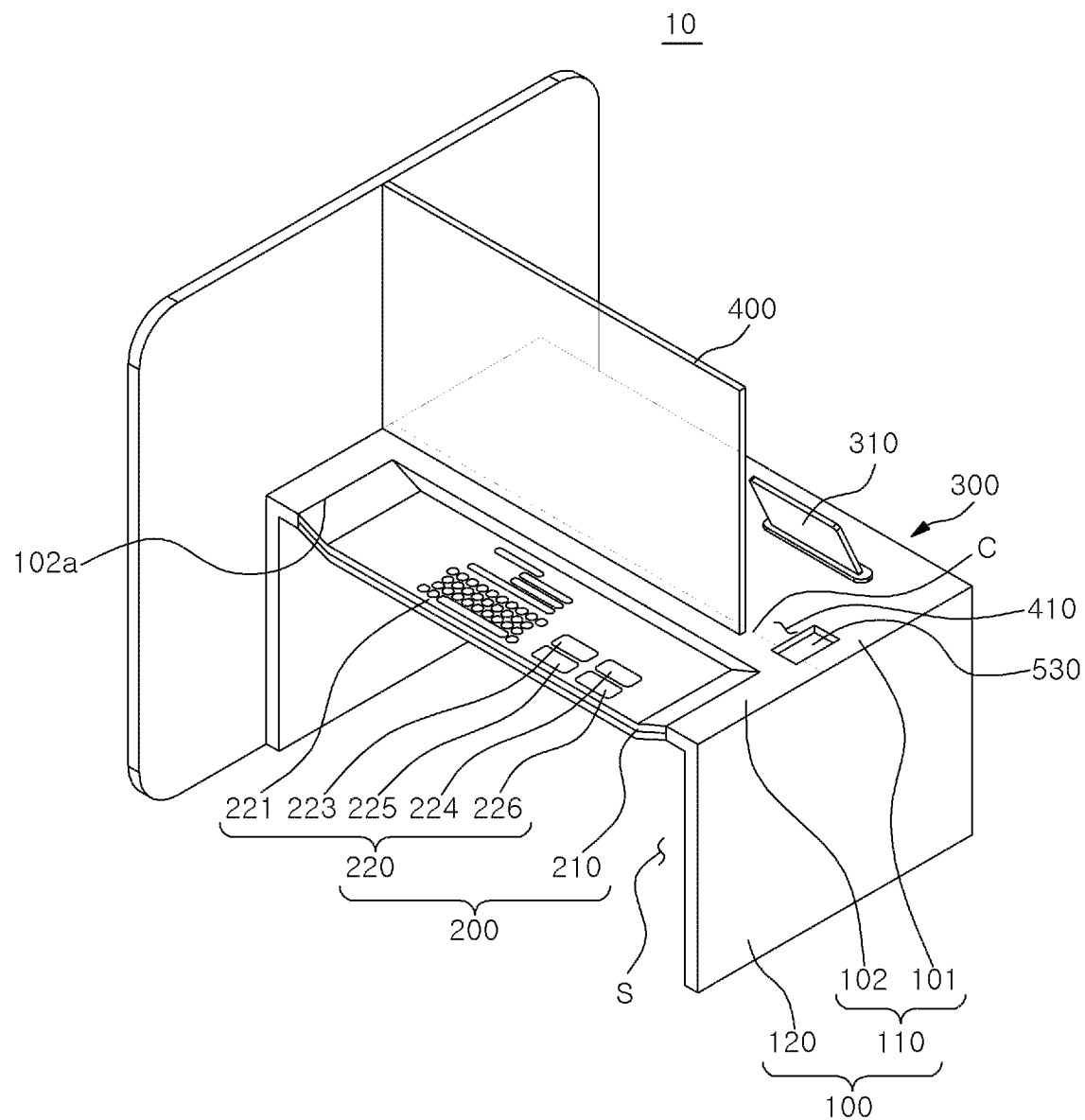
FIG. 4 is a perspective view showing a digital module built-in desk according to a second implementation of the present disclosure.
Figure 5:
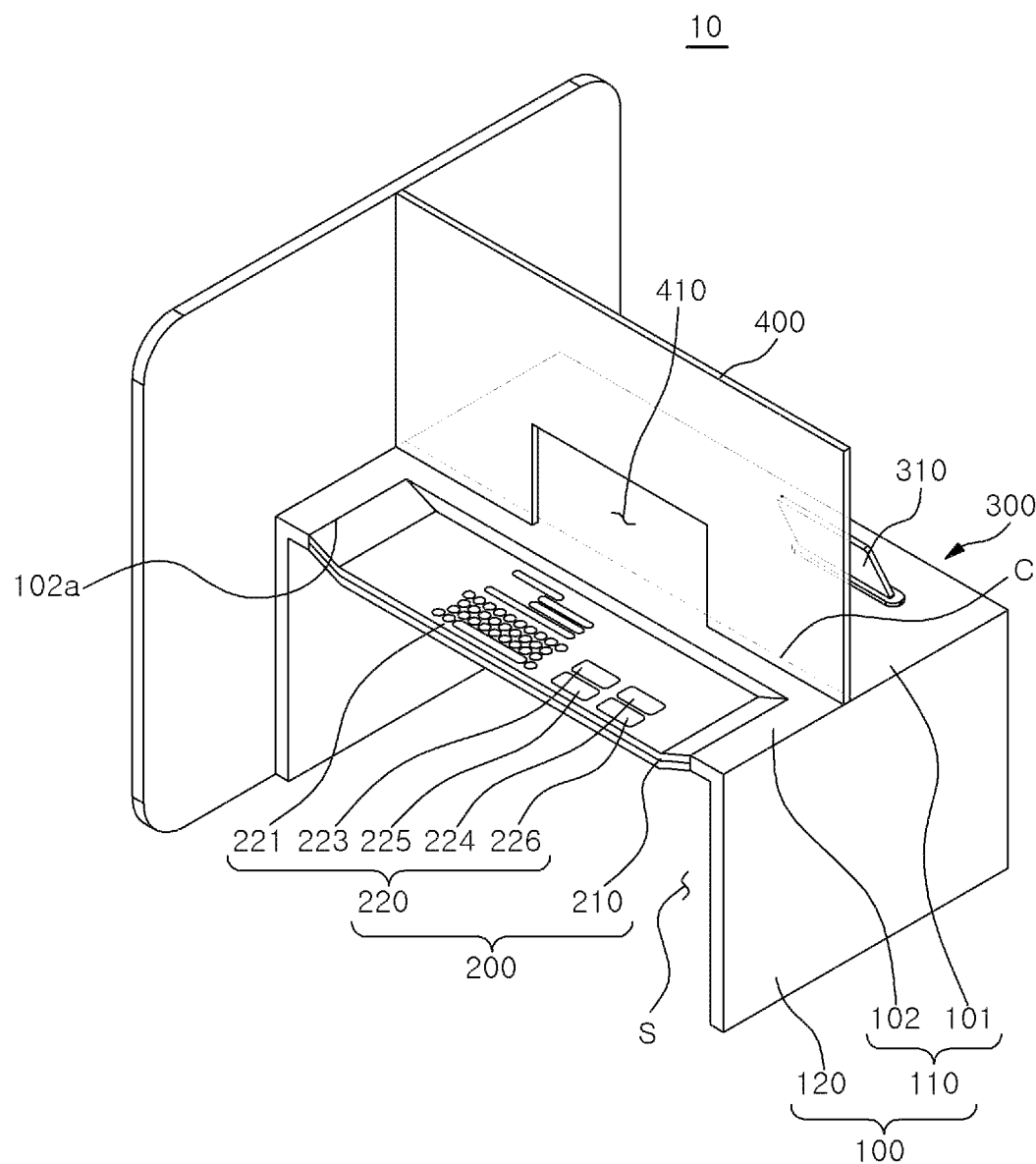
FIG. 5 is a perspective view showing a digital module built-in desk according to a modification of the second implementation.

FIG. 4 is a perspective view showing a digital module built-in desk according to a second implementation of the present disclosure, and FIG. 5 is a perspective view showing a digital module built-in desk according to a modification of the second implementation.

As shown in FIG. 4, the digital module built-in desk 10 according to the second implementation includes a desk body 100, a customer digital module 200, a clerk digital module 300, and a partition 400.

The second implementation has a difference from the above-described first implementation in that it further includes the partition 400 as compared with the first implementation. Accordingly, in describing the second implementation of the present disclosure, there will be described mainly the difference between the second implementation and the first implementation, and like reference numerals are given to like components and redundant description thereof will be omitted.

The partition 400 may be installed along the center line C of the desk body 100 to partition between the clerk-side desk portion 101 and the customer-side desk portion 102. The partition 400 may be configured as a display for outputting an image, and the display may be a transparent display made of an entirely transparent material or an opaque display which is at least partially made of an opaque material. In addition, the partition 400 may be provided in the form of a transparent plastic plate.

When the partition 400 is configured as a display, the partition 400 may include at least one of a liquid crystal display (LCD), a light emitting diode (LED) and a head up display (HUD). The partition 400 may display information input by a clerk through the LCD, LED or HUD. For example, the partition 400 may display business transaction information required for a business transaction or a business service requested by a customer, so that the customer can grasp at a glance the information input by the clerk through the partition 400.

The partition 400 may provide a customer service passage 410 of a predetermined size for a business transaction between the clerk and the customer. As an example, as shown in FIG. 4, the customer service passage 410 may be a space of a predetermined size provided on one side of the partition 400. A transfer tray 530 for transfer of business transaction documents between the clerk and the customer may be positioned in the customer service passage 410.

Alternatively, as shown in FIG. 5, the customer service passage 410 may be an opening of a predetermined size formed in a lower portion of the partition 400.

Figure 6:
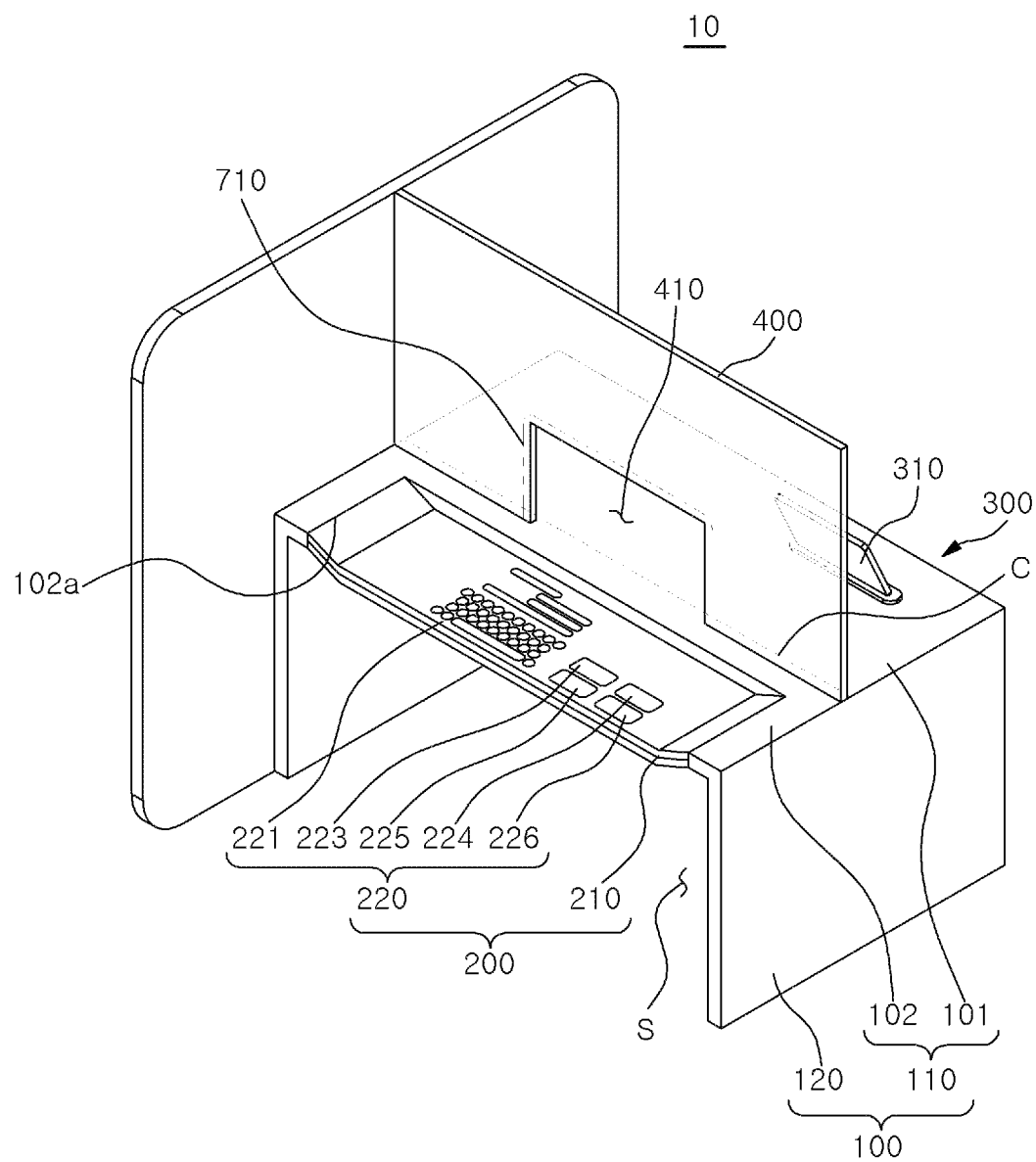
FIG. 6 is a perspective view showing a digital module built-in desk according to a third implementation of the present disclosure.

FIG. 6 is a perspective view showing a digital module built-in desk according to a third implementation of the present disclosure.

As shown in FIG. 6, the digital module built-in desk 10 according to the third implementation includes a desk body 100, a customer digital module 200, a clerk digital module 300, a partition 400 and a sterilization module 710.

The sterilization module 710 may include a sterilization lamp provided at a lower end portion of the partition 400 to sterilize the partition 400. For example, the sterilization module 710 may be an ultraviolet (UV) sterilization lamp that sterilizes the partition 400 by irradiating UV light to the partition 400.

Figure 7:
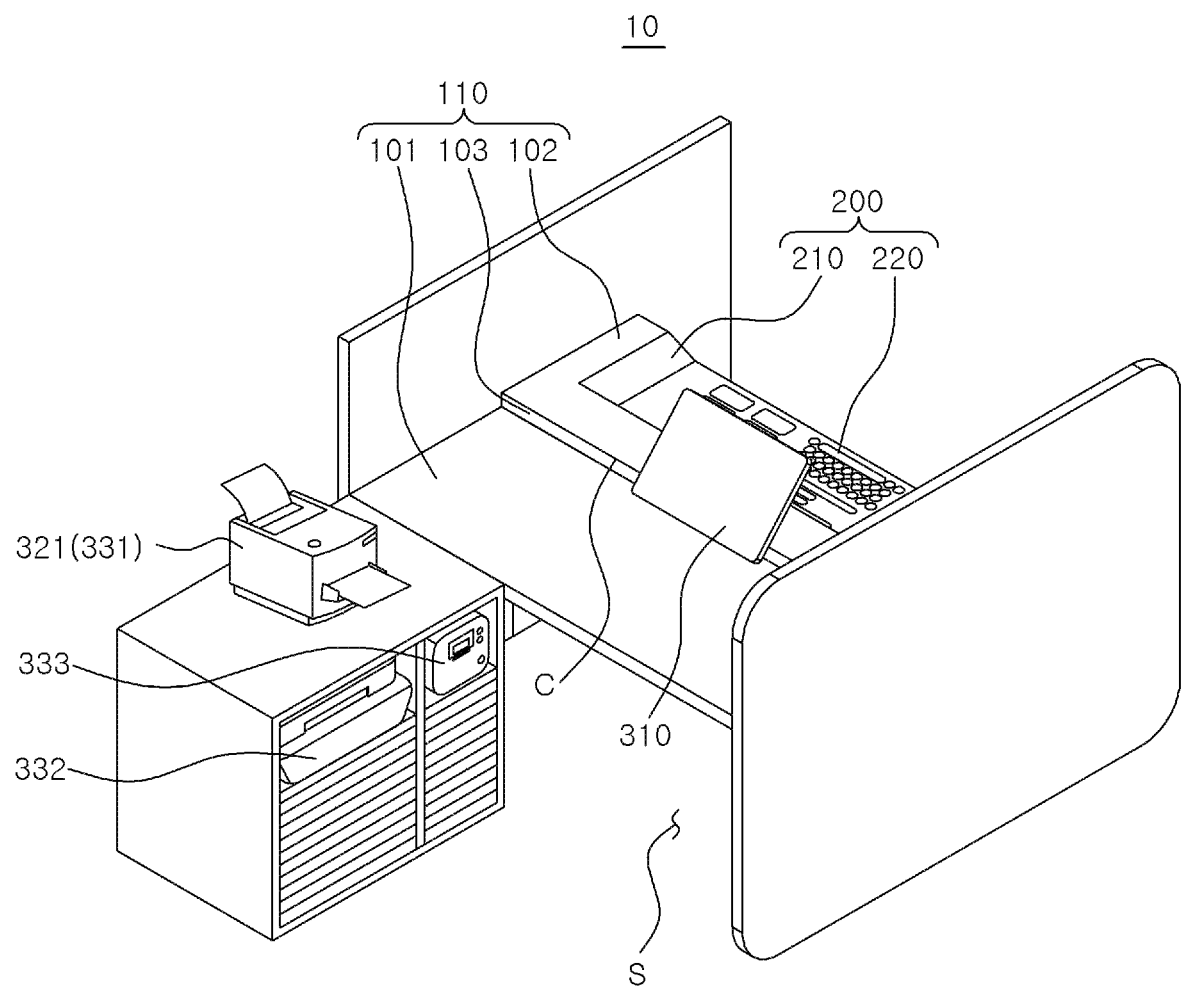
FIG. 7 is a perspective view illustrating a digital module built-in desk according to a fourth implementation of the present disclosure.
Figure 8:
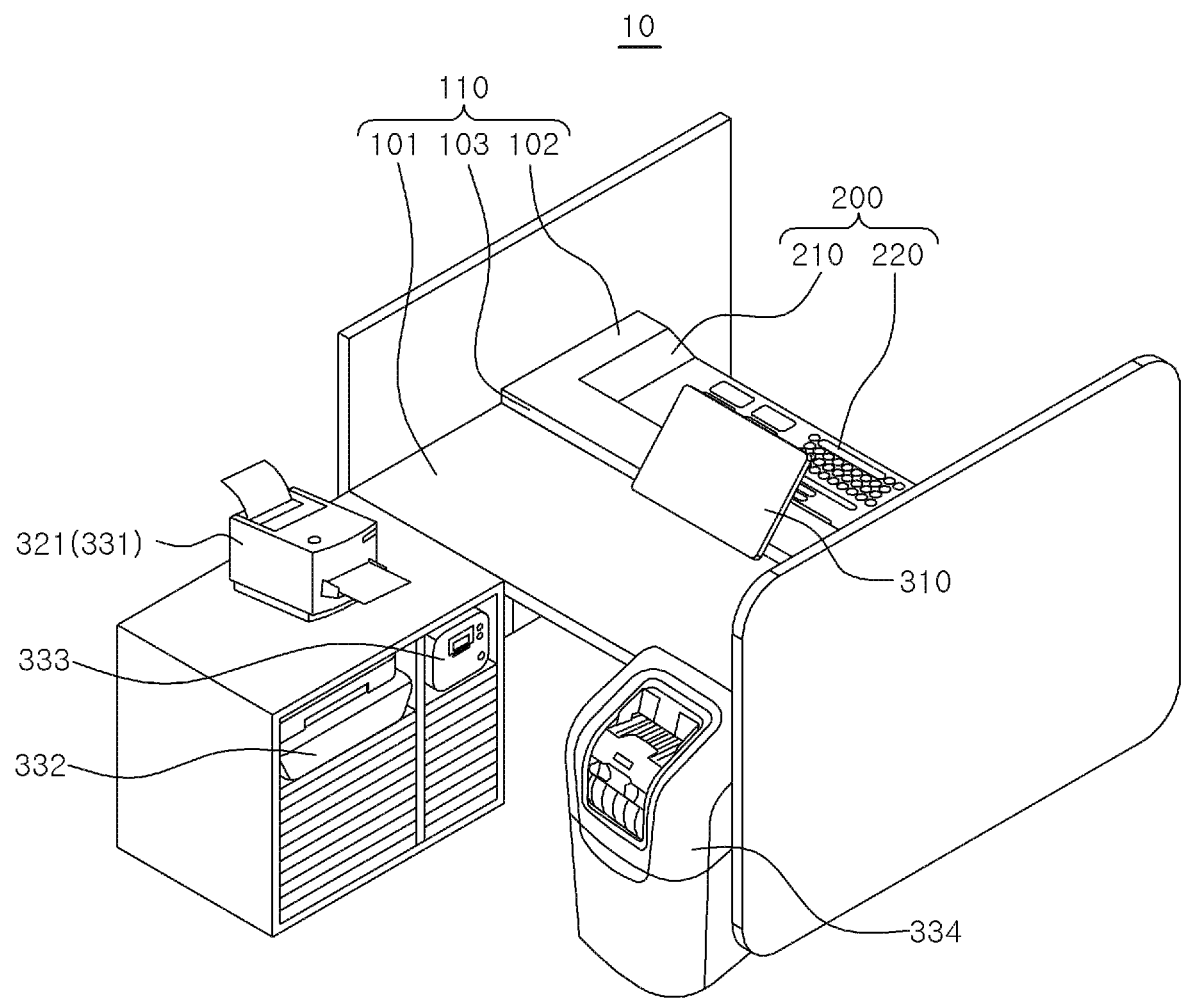
FIG. 8 is a perspective view illustrating a digital module built-in desk in which a teller cash recycler (TCR) is further provided to the digital module built-in desk of FIG. 7.

FIG. 7 is a perspective view illustrating a digital module built-in desk according to a fourth implementation of the present disclosure, and FIG. 8 is a perspective view illustrating a digital module built-in desk in which a teller cash recycler is further provided to the digital module built-in desk of FIG. 7.

As shown in FIGS. 7 to 8, in the digital module built-in desk 10 according to the fourth implementation, the upper plate 110 includes a clerk-side desk portion 101, a customer-side desk portion 102, and a stepped portion 103.

The fourth implementation has a difference from the above-described implementations in that the upper plate 110 further includes the stepped portion 103 as compared with the above-described implementations. Accordingly, in describing the fourth implementation of the present disclosure, there will be described mainly the difference between the fourth implementation and the above-described implementations, and like reference numerals are given to like components and redundant description thereof will be omitted.

The stepped portion 103 may be formed along the center line C of the desk body 100 so that the clerk-side desk portion 101 and the customer-side desk portion 102 have a height difference. In this case, the clerk-side desk portion 101 may be located below the customer-side desk portion 102 through the stepped portion 103. The clerk-side monitor 310 may be mounted at the stepped portion 103.

Figure 9:
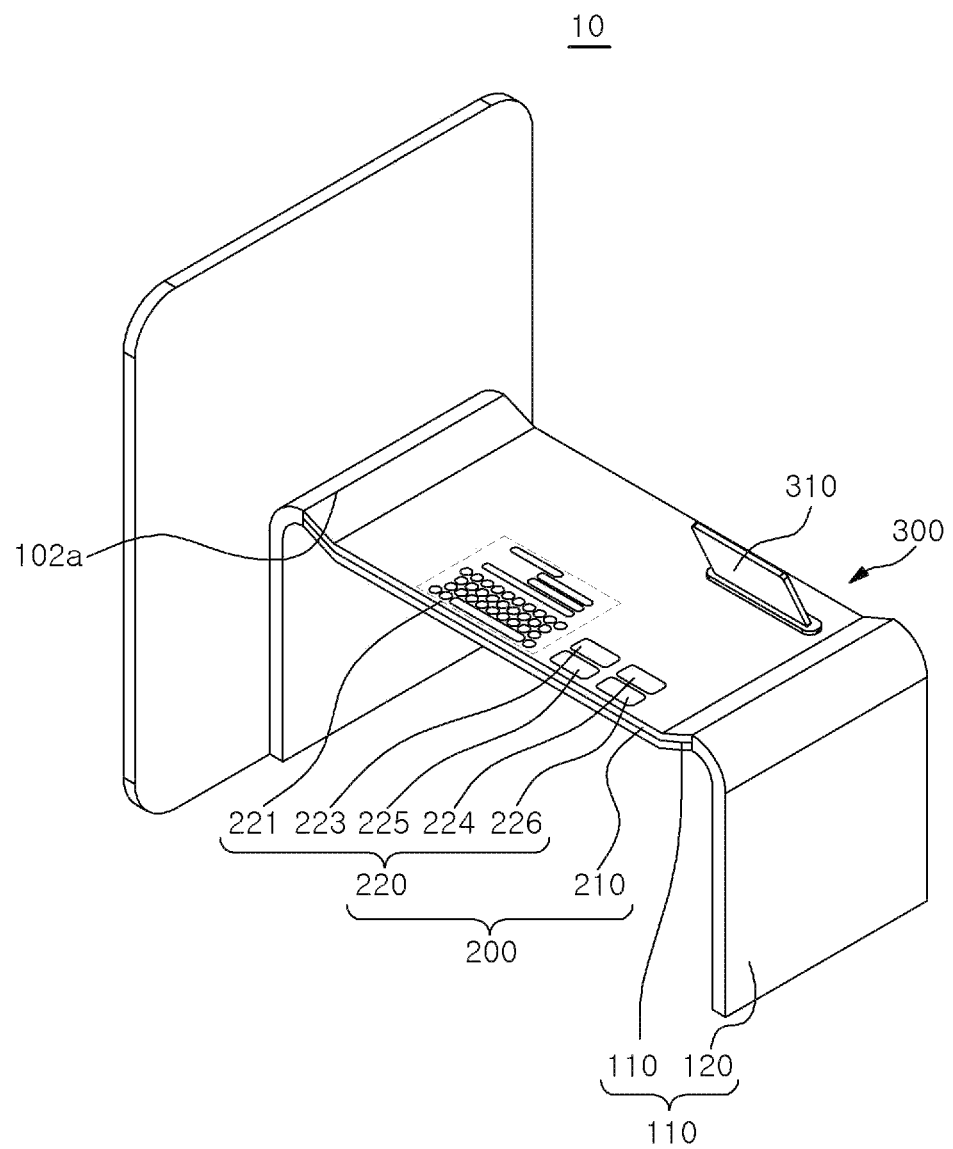
FIG. 9 is a perspective view showing a digital module built-in desk according to a fifth implementation of the present disclosure.

FIG. 9 is a perspective view showing a digital module built-in desk according to a fifth implementation of the present disclosure.

As shown in FIG. 9, in the digital module built-in desk 10 according to the fifth implementation, the customer digital module 200 may be mounted in the module mounting recess 102*a* of the upper plate 110, and the clerk-side monitor 310 may be mounted at an upper side of the customer digital module 200.

The fifth implementation has a difference from the above-described first implementation in that the customer digital module 200 is mounted on the upper plate 110 of the first implementation as a whole. Accordingly, in describing the fifth implementation of the present disclosure, there will be described mainly the difference between the fifth implementation and the first implementation, and like reference numerals are given to like components and redundant description thereof will be omitted.

The customer digital module 200 may be provided to cover the upper surface of the upper plate 110 as a whole. In addition, a customer-side input device 220 may be located on the customer side of the customer digital module 200. For example, a tablet 221, a pin pad 223, an identification card scanner 224, a palm vein scanner 226 and the like may be provided on the customer side of the customer digital module 200.

Figure 10:
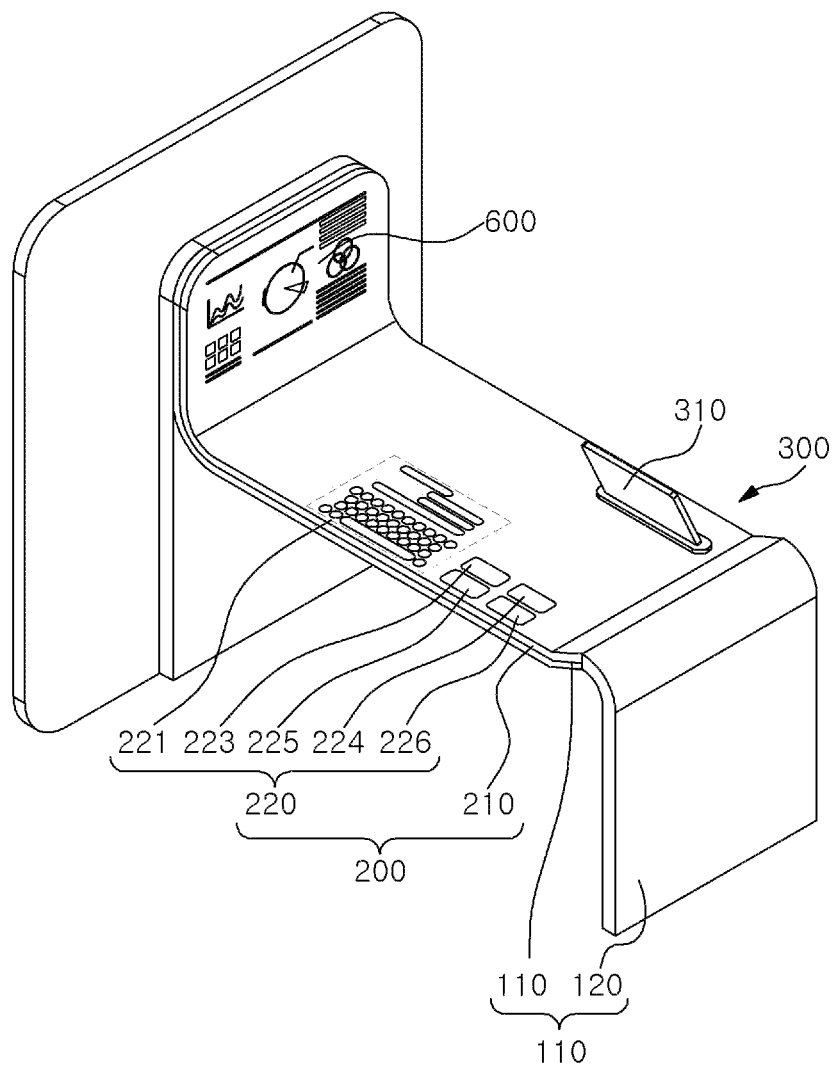
FIG. 10 is a perspective view showing a digital module built-in desk according to a modified example of the fifth implementation.

FIG. 10 is a perspective view showing a digital module built-in desk according to a modified example of the fifth implementation.

As shown in FIG. 10, in the digital module built-in desk 10 according to the modified example of the fifth implementation, an advertisement module 600 may be provided at one end portion of the upper plate 110.

The advertisement module 600 may be installed at one end portion of the upper plate 110 to be perpendicular to the upper plate 110. The advertisement module 600 may include a display, an LCD, an LED or an HUD which is capable of displaying specific information, photographs, graphs and the like.

The advertisement module 600 may provide an advertisement board function for advertising a product of a bank, for example. Accordingly, a customer may receive information on various types of bank products through the advertisement module 600.

As described above, in accordance with the implementations of the present disclosure, it is possible to accurately distinguish between a device for the customer and a device for the clerk at a bank window, and the customer can use the device for the customer. In addition, it is possible to implement a self-banking service with face-to-face assist, thereby minimizing business services requested by customers and enhancing work efficiency. Further, it is possible to minimize materials put on the desk through the digitalized work environment. Moreover, even in the epidemic of an infectious disease, smooth consultation can be performed between the clerk and the customer since the possibility of infection is reduced.

While the implementations of the present disclosure have been described with reference to the accompanying drawings, it will be understood by those skilled in the art that the present disclosure can be implemented in other specific forms without changing the technical spirit or essential features of the present disclosure. For example, those skilled in the art can implement the present disclosure in the form that is not clearly described in the implementations of the present disclosure by changing materials, sizes and the like of the respective components depending on application fields or by combining or replacing the implementations without departing from the scope of the present disclosure. Therefore, it should be noted that the above-described implementations are merely illustrative in all aspects and are not to be construed as limiting the present disclosure and also that the modifications are included in the technical spirit of the present disclosure which is described in the following claims.

What is claimed is:

1. A digital module built-in desk configured to be placed at a location where business transactions between a clerk and a customer are performed, the digital module built-in desk comprising:
   a desk body including an upper plate having a customer-side desk portion providing a space for the customer; and
   a customer digital module mounted in the customer-side desk portion, the customer digital module including:
      a tablet configured to receive information inputted for the business transactions, and
      a customer-side board disposed at the customer-side desk portion and recessed downward from the customer-side desk portion.

2. The digital module built-in desk of claim 1, wherein the desk body further comprises a clerk-side desk portion providing a space for the clerk, and
   wherein the customer-side desk portion and the clerk-side desk portion are disposed opposite to each other with respect to a center line of the upper plate.

3. The digital module built-in desk of claim 2, further comprising:
   a partition installed along the center line to partition between the clerk-side desk portion and the customer-side desk portion.

4. The digital module built-in desk of claim 1, wherein the customer digital module further comprises:
   at least one of a sign pad, a pin pad, an identification card scanner, a seal scanner, an intestinal vein terminal, a near field communication (NFC) reader, and a fingerprint reader which are provided in the customer-side board.

5. The digital module built-in desk of claim 2, further comprising:
   a clerk digital module provided at the clerk-side desk portion, the clerk digital module including a clerk-side monitor for displaying the information for the business transactions.

6. The digital module built-in desk of claim 5, wherein the clerk digital module further comprises:
   a clerk-side input device connected to the clerk-side monitor to allow the clerk to input information;
   a clerk-side output device for outputting data on a business service; and
   a personal computer for controlling the clerk-side monitor, the clerk-side input device, and the clerk-side output device.

7. The digital module built-in desk of claim 6, wherein the clerk-side input device includes a scanner, and
   wherein the clerk-side output device includes at least one of a paper printer, a passbook printer, a card issuing machine and a Teller cash recycler.

8. The digital module built-in desk of claim 6, wherein the desk body further includes a wiring hole extending through the customer-side desk portion and the clerk-side desk portion to connect between the customer digital module and the personal computer.

9. The digital module built-in desk of claim 3, wherein the partition is a transparent display panel or an opaque display panel which includes at least one of a liquid crystal display, a light emitting diode, and a head up display.

10. The digital module built-in desk of claim 3, wherein the partition provides a service passage of a predetermined size for the business transactions between the clerk and the customer.

11. The digital module built-in desk of claim 1, further comprising:
an advertisement module, installed at one end portion of the upper plate, for displaying advertisement for a product.

12. The digital module built-in desk of claim 3, further comprising:
a sterilization module provided at a lower end portion of the partition and configured to sterilize the partition.

13. The digital module built-in desk of claim 12, wherein the sterilization module comprises a sterilization lamp provided at the lower end portion of the partition and configured to emit light toward the upper plate.

14. The digital module built-in desk of claim 12, wherein the partition defines a service passage having a predetermined size for the business transactions between the clerk and the customer, and
wherein the sterilization module comprises a sterilization lamp provided along a periphery of the service passage and configured to emit light toward the service passage.

15. The digital module built-in desk of claim 1, wherein an upper surface of the customer-side board is recessed downward relative to an upper surface of the customer-side desk portion.

16. The digital module built-in desk of claim 1, wherein the customer-side board horizontally extends and accommodates the tablet.

* * * * *